United States Patent
Roessner

(10) Patent No.: US 8,764,365 B2
(45) Date of Patent: Jul. 1, 2014

(54) SCREW ANCHOR AND METHOD FOR PRODUCING A SCREW ANCHOR

(75) Inventor: Marcel Roessner, Rankweil (AT)

(73) Assignee: Hilti Aktiengesellschaft, Schaan (LI)

( * ) Notice: Subject to any disclaimer, the term of this patent is extended or adjusted under 35 U.S.C. 154(b) by 21 days.

(21) Appl. No.: 13/349,434

(22) Filed: Jan. 12, 2012

(65) Prior Publication Data
US 2012/0183372 A1    Jul. 19, 2012

(30) Foreign Application Priority Data
Jan. 13, 2011    (DE) .......................... 10 2011 002 637

(51) Int. Cl.
*F16B 35/00*    (2006.01)

(52) U.S. Cl.
USPC ............................. 411/395; 411/382; 411/436

(58) Field of Classification Search
USPC ......... 411/378, 381, 382, 395, 411, 418, 424, 411/432, 436
See application file for complete search history.

(56) References Cited

U.S. PATENT DOCUMENTS

| | | | | |
|---|---|---|---|---|
| 3,472,111 A * | 10/1969 | Ono Teizo | ....................... | 411/65 |
| 3,911,781 A * | 10/1975 | Bappert | ....................... | 411/418 |
| 4,892,429 A * | 1/1990 | Giannuzzi | ....................... | 411/383 |
| 5,102,276 A * | 4/1992 | Gourd | ........................... | 411/392 |
| 5,354,299 A * | 10/1994 | Coleman | ....................... | 606/916 |
| 5,549,431 A * | 8/1996 | Royle | ............................ | 411/389 |
| 5,645,547 A * | 7/1997 | Coleman | ....................... | 606/304 |
| 6,030,162 A * | 2/2000 | Huebner | ....................... | 411/413 |
| 6,102,751 A * | 8/2000 | Becker | .......................... | 439/843 |
| 2004/0172032 A1* | 9/2004 | Jackson | ......................... | 606/73 |
| 2010/0209204 A1 | 8/2010 | Wissling et al. | | |

FOREIGN PATENT DOCUMENTS

| | | |
|---|---|---|
| CA | 2092700 A1 | 6/1992 |
| DE | 1 176 450 B | 8/1964 |
| DE | 40 39 831 C1 | 6/1992 |
| DE | 695 20 929 T2 | 10/2001 |
| DE | 10 2006 003 1 | 7/2007 |
| DE | 10 2009 000 8 | 8/2010 |
| EP | 0 501 201 A1 | 9/1992 |
| EP | 0 716 237 A1 | 6/1996 |

OTHER PUBLICATIONS

German Office Action dated Apr. 5, 2013 (Eight (8) pages).

* cited by examiner

*Primary Examiner* — Roberta Delisle
(74) *Attorney, Agent, or Firm* — Crowell & Moring LLP

(57) ABSTRACT

A screw anchor for insertion into concrete is disclosed. The screw anchor has an essentially cylindrical base body on whose outer lateral surface an external thread is provided and which has a receptacle arranged in the direction of the cylinder longitudinal axis originating from an axial end face. The receptacle has a load-bearing structure originating from the axial end face. A tool receptacle extending essentially in the direction of the cylinder longitudinal axis is provided in the receptacle, wherein the tool receptacle extends further into the receptacle than the load-bearing structure from the end face to the rotary drive of the screw anchor in the cylinder longitudinal direction.

11 Claims, 3 Drawing Sheets

SCREW ANCHOR AND METHOD FOR PRODUCING A SCREW ANCHOR

This application claims the priority of German Patent Document No. DE 10 2011 002 637.1, filed Jan. 13, 2011, the disclosure of which is expressly incorporated by reference herein.

BACKGROUND AND SUMMARY OF THE INVENTION

The invention relates to a screw anchor for insertion into concrete having an essentially cylindrical base body on whose outer lateral surface an external thread is provided and which has a receptacle for a fastening means arranged in the direction of the cylinder longitudinal axis originating from an axial end face, the receptacle having a load-bearing structure for the fastening means originating from the axial end face.

The invention also relates to a method for producing such a screw anchor.

To fasten components in a concrete substrate, screw anchors that are screwed into the concrete substrate are frequently used. The advantage of these screw anchors over expansion plugs or expansion impact anchors is that this type of screw anchor is also anchored securely in the concrete without an additional expansion element and a reversible fastening of the component is possible.

The screw anchor has a thread on the outside, with which the screw anchor may be screwed into a prepared borehole in the concrete substrate as well as into a receptacle running in the axial direction, in which a fastening means for fastening the component may be fixed. The receptacle features a suitable load-bearing structure for this purpose, for example, a thread for a screw.

To screw the screw anchor into the concrete substrate, a tool receptacle is required on which a tool may engage in order to rotate the screw anchor. This tool receptacle is frequently provided in or on the receptacle in order to be able to screw the screw anchor completely into the concrete substrate so that it terminates flush with the concrete surface. The disadvantage of this, however, is that the load-bearing structure of the receptacle may be damaged by the tool with the high screw-in forces that are required when screwing into a concrete substrate so that the load-bearing structure is not useable and subsequent processing of the load-bearing structure may possibly be required after the screw anchor has been mounted.

The object of the invention is making a screw anchor available, which makes it possible to screw the screw anchor into a concrete substrate simply and securely and prevent damage to the load-bearing structure in the process.

According to the invention, in the case of a screw anchor for insertion into concrete having an essentially cylindrical base body on whose outer lateral surface an external thread is provided and which has a receptacle for a fastening means arranged in the direction of the cylinder longitudinal axis originating from an axial end face, the receptacle having a load-bearing structure for the fastening means originating from the axial end face, a tool receptacle extending essentially in the direction of the cylinder longitudinal axis is provided in the receptacle, wherein the tool receptacle extends further into the receptacle than the load-bearing structure from the end face to the rotary drive of the screw anchor in the cylinder longitudinal direction.

The tool receptacle is thus configured to be long enough that the torque, which is applied via the tool to the screw anchor or to the receptacle of the screw anchor, is not transmitted completely in the area of the load-bearing structure, but at least partially outside of this area. Furthermore, due to the length of the tool receptacle, the torque is transmitted over a larger area so that strong punctual loads, which could lead to a deformation or damage of the load-bearing structure, may be reduced considerably.

The tool receptacle preferably extends over the entire axial length of the receptacle so that the load may be transmitted to the screw anchor over an area that is as large as possible. The advantage of this is that a torsion load of the screw anchor may be reduced. If the tool were to engage on the screw anchor only over a short length on the axial end face, this would produce a torsion load between a first end of the screw anchor, on which the tool engages, and the opposite second end of the screw anchor, with which the screw anchor is already inserted into the concrete borehole, at the beginning of the screw-on process due to the high screw-in forces. Because of the long tool receptacle, the load contact point is effectively distributed over the entire length of the receptacle, and also approaches nearer to the second end so that the torsion load may be reduced considerably.

In a preferred embodiment, the receptacle extends through the entire base body up to an opposing second end face. As a result, an ideal load transmission is possible because the tool may be supported on the receptacle over the entire length of the screw anchor. As a result, a twisting or a torsion of the screw anchor may be completely prevented primarily at the beginning of the screw-in process, because the load contact point is located at the same axial height with the concrete surface or with the contact surface of the screw anchor with the borehole.

In addition, the continuous receptacle makes an especially easy production of the screw anchor possible. The screw anchor may be produced, for example, from a long tube, which is already provided continuously with the tool receptacle on the inside, wherein the tube is cut to length forming several base bodies each at the desired length. The thread may be introduced before or after cutting to length. Subsequent introduction of the load bearing structure is also simplified considerably, because a cutting or milling tool may simply be slid through the entire receptacle. Cleaning the receptacle of chips is considerably simpler than with a receptacle that is closed on one side.

The object of the invention is also attained by a screw anchor for insertion into concrete having an essentially cylindrical base body on whose outer lateral surface an external thread is provided and which has a receptacle for a fastening means arranged in the direction of the cylinder longitudinal axis originating from an axial end face, the receptacle having a load-bearing structure for the fastening means originating from the axial end face, wherein the tool receptacle and the load-bearing structure extend over the entire axial length of the receptacle.

The tool receptacle is formed, for example, by at least one groove running essentially in the cylinder longitudinal axis, in which a tool may be inserted or removed from the tool receptacle in the direction of the cylinder longitudinal axis.

Several grooves running essentially parallel are preferably arranged such that the tool is centered in the middle in the receptacle and the rotational axis of the tool coincides with the cylinder longitudinal axis of the base body. As a result, a uniform load transmission of the torque on the screw anchor is possible.

The grooves form a multi-edged profile, for example, so that a conventional tool such as a screwdriver or a Torx tool may engage in the tool receptacle.

Ideally, the grooves are designed to be deeper in the radial direction than the load-bearing structure. This offers several advantages. For one, a large contact surface is provided for load transmission of the torque because of the large side surface of the grooves. The contact surface lies outside of the load-bearing structure so that the tool does not come into contact with the load-bearing structure when the screw anchor is turned and the load-bearing structure cannot be damaged when torque is applied. In addition, a simple production of the load-bearing structure is possible because of the deeper grooves. Due to the deep grooves, a corresponding cutting tool may be inserted into the receptacle and the load-bearing structure may be introduced into the receptacle by turning this cutting tool in the receptacle.

The load-bearing structure is an internal thread for example. The introduction of such a thread is considerably simpler in the case of a screw anchor according to the invention than with a conventional screw anchor. The thread is usually cut into the receptacle with a thread cutter, which is screwed into the receptacle from the axial end face. In doing so, the thread cutter may cut only one thread turn per revolution of the thread cutter, i.e., one thread section revolving by 360 degrees. Correspondingly, many revolutions of the thread cutting tool are thus required to produce a longer thread. Similarly, after completion of the thread, the thread cutting tool must be unscrewed from the thread over the entire length of the thread.

A cutting tool having several radially projecting cutting edges arranged successively in the axial direction may be used with a screw anchor according to the invention, wherein a number of cutting edges are preferably provided that corresponds to the number of desired thread turns. The tool is inserted into the receptacle, wherein the cutting edges are inserted into one of the grooves. Once the cutting tool has been inserted into the receptacle, the cutting tool is rotated around its longitudinal axis, wherein each cutting edge cuts a complete thread turn of the thread. The entire length of the thread may thus be cut with one revolution of the cutting tool. Then the cutting tool is aligned such that the cutting edges lie in a groove so that the cutting tool may be pulled out of the receptacle in the axial direction. The thread may be produced substantially quicker as a result. This is made possible in that the thread root does not project outwardly as far radially as the recess of the load receptacle. In the case of several uniformly distributed grooves, a tool having several rows of cutting edges distributed in the circumferential direction may also be used so that the cutting tool only has to be turned by the angle between two adjacent grooves to cut the entire thread length.

The receptacle of the screw anchor is preferably completely closed in the circumferential direction.

The base body may have a tubular form for example.

According to the invention, a method is also provided for producing a screw anchor according to the invention having the following steps:
providing a base body having an elongated receptacle;
introducing the tool receptacle into the receptacle; and
subsequent introduction of the load-bearing structure.

In the case of such a method, a tube is preferably made available, in which the tool receptacle is continuously present on the inside, wherein the tube is cut to length forming several base bodies before or after introducing the load-bearing structure.

Additional advantages and features are disclosed in the following description in conjunction with the attached drawings.

DETAILED DESCRIPTION OF THE DRAWINGS

Figure 1:
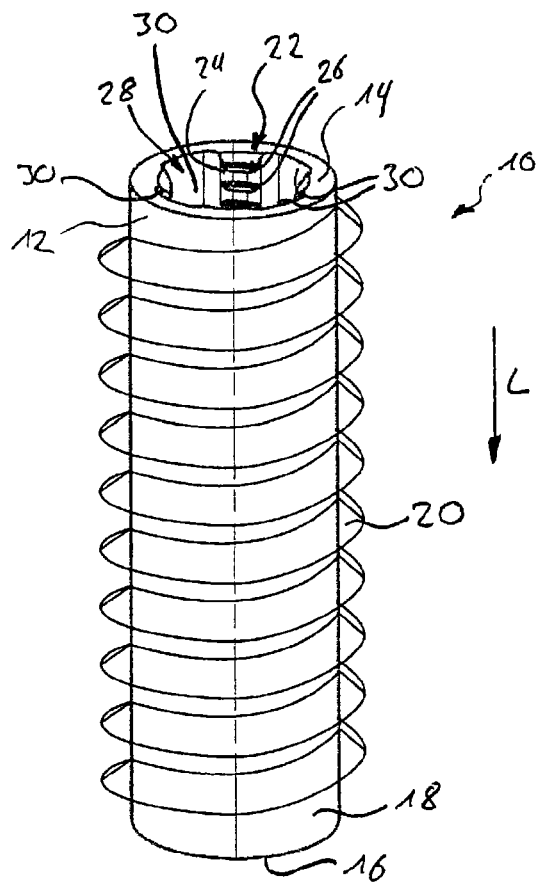
FIG. 1 is a perspective view of a screw anchor according to the invention.

In FIG. 1 depicts a screw anchor 10 for screwing into concrete. The screw anchor may be screwed into a borehole of the concrete base body for fastening a component on a concrete base body. Then a component to be fastened on the concrete part may be mounted on the screw anchor 10 for example with an additional fastening element and therewith be fastened on the concrete part.

The screw anchor 10 has a cylindrical base body 12 having a first axial end face 14, a second axial end face 16 as well as a lateral surface 18. An external thread 20 is provided on the lateral surface 18 of the base body 12, with which the screw anchor 10 may be screwed into a borehole in a concrete body and thereby be fixed on the concrete body.

Figure 3:
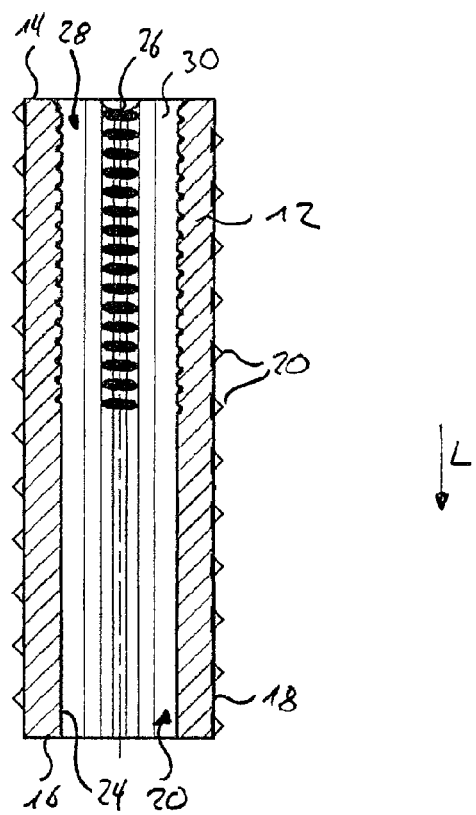
FIG. 3 is a sectional view through the screw anchor from FIG. 1 along line III-III in FIG. 2.
Figure 4:
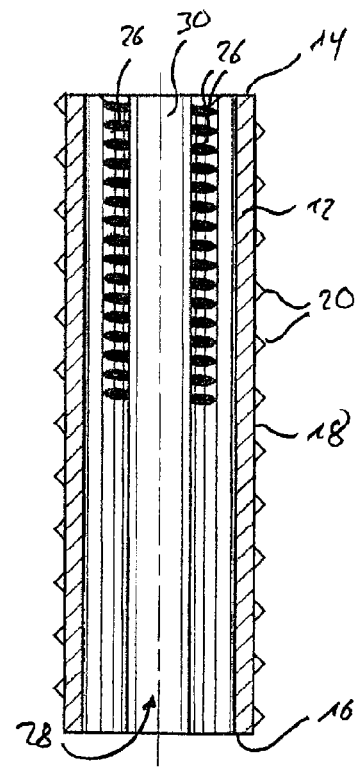
FIG. 4 is a section view through the screw anchor along line IV-IV in FIG. 2.

The base body 12 also has a receptacle 22, which, as FIGS. 3 and 4 show, extends from the first end face 14 over the entire length of the base body 12 to the second axial end face 16 so that the base body 12 essentially has a tubular shape.

Provided on the inside wall 24 of the receptacle 22 is a load-bearing structure 26, which extends into the receptacle 22 from the first end face 14 in the direction of the cylinder longitudinal axis L. The load-bearing structure 26 in this case is formed by an internal thread, into which a fastening means having a corresponding external thread may be screwed and thereby be fixed on the screw anchor 10.

In order to be able to screw the screw anchor 10 into the borehole of the concrete base body, a tool receptacle 28 is provided, in which a tool may be inserted in the direction of the cylinder longitudinal axis L for transmitting a torque to the screw anchor 10. The tool receptacle 28 in this case is formed by four grooves 30 running in the cylinder longitudinal direction L, which extend outwardly from the inside wall 24 of the receptacle 22 in the radial direction R. The load-bearing structure 26 and the tool receptacle 28 consequently overlap.

Figure 2:
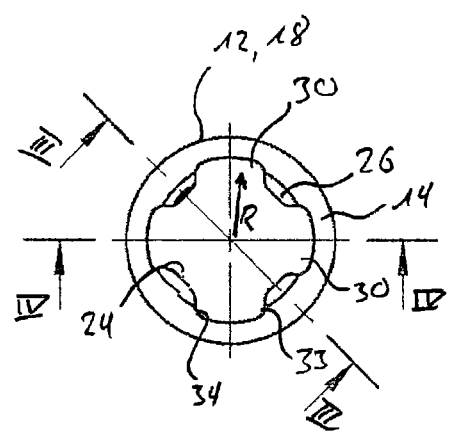
FIG. 2 is a top view of the screw anchor from FIG. 1.

As FIG. 2 in particular shows, the four grooves 30 are arranged distributed uniformly in the circumferential direction on the inside wall 24 of the receptacle 22 so that the angle between two adjacent grooves 30 is 90°. However, the number as well as the arrangement of the grooves 30 may also be modified as desired. However, the grooves 30 are preferably arranged so that the axis of the torque, which is transmitted to the screw anchor 10 by the tool, lies on the cylinder longitudinal axis L.

As FIGS. 3 and 4 in particular show, the grooves 30 of the tool receptacle 28 extend over the entire length of the receptacle, i.e., over the entire length of the base body 12 of the screw anchor 10, while the load-bearing structure 26 formed by the internal thread extends originating from the first axial end face 14 merely over approximately half the length of the receptacle 22. The tool receptacle 28 formed by the grooves 30 thus extends further into the receptacle 22 than the load-bearing structure 26 originating from the first end face 14 in the direction of the cylinder longitudinal axis L.

As FIG. 2 shows, the grooves 30 are formed to be deeper in the radial direction R than the load-bearing structure 26. In other words, the side walls 33 of the grooves 30 essentially lie outside the load-bearing structure 26, also viewed in the radial direction. In the circumferential direction the corresponding depressions are offset from one another.

Figure 5:
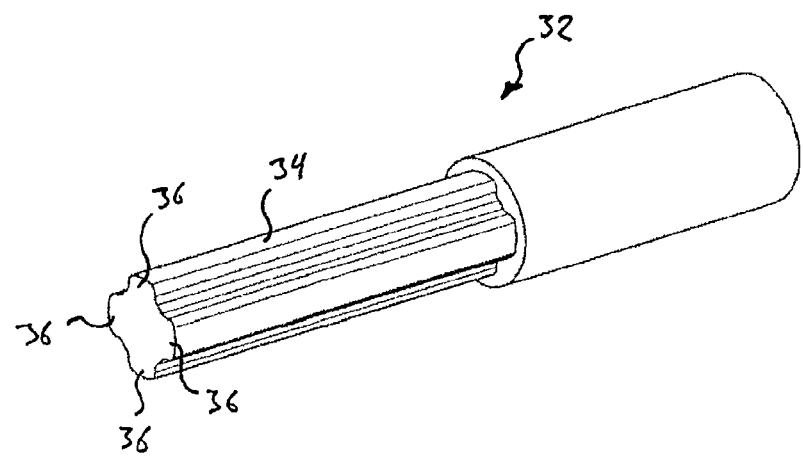
FIG. 5 is a tool for screwing in the screw anchor from FIG. 1.

A tool 32 for screwing in the screw anchor 10 is depicted in FIG. 5 for example. The tool has a support structure 34, which features four axial rails 36 arranged in cruciform manner 36. The support structure 34 of the tool may be inserted into the receptacle 22 of the screw anchor 10, wherein the rails 36 penetrate the grooves 30.

The support structure 34 or the rails 36 viewed essentially in cross-section are complementary to the cross-section of the receptacle 22 or the grooves 30 so that the rails 36 may transmit a torque to the screw anchor. The length of the support structure 34 corresponds essentially to the length of the receptacle 22, i.e., the length of the screw anchor 10 in this case, so that the tool 32 may engage on the grooves 30 over the entire length of the screw anchor 10.

The advantage of this is that the torque may be transmitted uniformly to the screw anchor 10. If the tool 32 were only to engage on the first end face 14 or on the region of the receptacle 22 adjacent to the first end face 14, a torsion of the screw anchor 10 between the second end face 16, which is already screwed into the borehole, and the first end face 14, on which the tool 32 engages, would be generated primarily at the beginning of the screw-in process due to the high forces required for screwing in the screw anchor 10. This type of twisting is precluded because the tool 32 engages over the entire length of the screw anchor 10 on the screw anchor.

In addition, the punctual load on the grooves 30 is reduced so much due to the large transmission surface that damage to the receptacle 22 by the tool and thus also to the load-bearing structure 26 is prevented. Because the tool receptacle 28 is designed to be longer than the load-bearing structure 26, a portion of the torque transmission occurs outside the load-bearing structure 26 so that the load on the receptacle 22 is again reduced in the area of the load-bearing structure 26 and therefore the risk of a damage to the load-bearing structure 26 may be reduced further. Because the grooves 30 are designed to be deeper than the load-bearing structure 26, the tool 32 does not engage on the receptacle 22 in the area of the load-bearing structure 26, thereby also protecting the load-bearing structure 26 from damage by the tool 32.

The screw anchor 10 offers a further advantage besides the better torque transmission, specifically the substantially simpler production. The base body 12 is produced, for example, from a tube, into which the tool receptacle 28 is introduced before or after cutting the screw anchor to the desired length, for example during extrusion molding. The load-bearing structure 26 may then be introduced in a further step of the process.

In the case of a conventional screw anchor, introducing a load-bearing structure 26 takes place for example in the case of a thread with thread cutter, which is screwed into the receptacle 22 from the first axial end face 14. In doing so, the thread cutter may cut only one thread turn per revolution of the thread cutter so that a correspondingly high number of revolutions of the thread cutting tool are required to produce a longer thread. Similarly, after completion of the thread, the thread cutting tool must be unscrewed from the thread over the entire thread length.

In the case of a screw anchor 10 according to the invention, a cutting tool may be used which has several radially projecting cutting edges arranged successively in the axial direction, preferably a number of cutting edges corresponding to the number of desired thread turns. The cutting tool is inserted completely into the receptacle 22, wherein the cutting edges are inserted into one of the grooves 30. Once the cutting tool as been inserted into the receptacle 22, the cutting tool is rotated around its longitudinal axis, wherein one complete thread turn is cut by each cutting edge. The entire length of the thread may thus be cut with one revolution of the cutting tool.

Then the cutting tool is aligned such that the cutting edges lie in a groove 30 so that the cutting tool may be pulled out of the receptacle 22 in the axial direction without rotating the cutting tool. In the case of several uniformly distributed grooves 30, a cutting tool having several cutting edges arranged distributed in the circumferential direction may be used so that the cutting tool only has to be turned by the angle between two adjacent grooves 30 to cut the entire screw length.

Furthermore, the production of the screw anchor 10 may be simplified further in that a tube is made available, in which a tool receptacle 28 is already continuously present on the inside. To produce the screw anchor 10, this tube only has to be cut to the desired length of the base body and the load-bearing structure 26 introduced in the receptacle 22.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A screw anchor, comprising:
    an essentially cylindrical base body with an external thread on an outer lateral surface of the cylindrical base body;
    a receptacle defined by the base body and extending in a direction of a longitudinal axis of the base body;
    a load-bearing structure on an inside wall of the receptacle and extending longitudinally from an axial end face of the base body; and
    a tool receptacle extending radially outwardly from the inside wall of the receptacle and longitudinally in the direction of the longitudinal axis;
    wherein the tool receptacle extends further longitudinally than the load-bearing structure from the axial end face of the base body.

2. The screw anchor according to claim 1, wherein the tool receptacle extends longitudinally over an entire axial length of the receptacle.

3. The screw anchor according to claim 1, wherein the receptacle extends through the base body to an opposite second axial end face of the base body.

4. The screw anchor according to claim 1, wherein the tool receptacle and the load-bearing structure extend longitudinally over an entire axial length of the receptacle.

5. The screw anchor according to claim 1, wherein the tool receptacle is at least one groove running essentially in the longitudinal direction.

6. The screw anchor according to claim 5, wherein the tool receptacle is a plurality of grooves running essentially parallel to each other.

7. The screw anchor according to claim 6, wherein the plurality of grooves form a multi-edged profile.

8. The screw anchor according to claim 6, wherein the plurality of grooves extend further radially outwardly than the load-bearing structure in the base body.

9. The screw anchor according to claim 1, wherein the load-bearing structure is an internal thread.

10. The screw anchor according to claim 1, wherein the receptacle is completely closed in a circumferential direction.

11. The screw anchor according to claim 1, wherein the base body has a tubular shape.

* * * * *